(12) United States Patent
Chak et al.

(10) Patent No.: US 9,910,562 B2
(45) Date of Patent: Mar. 6, 2018

(54) SKIMMING TO AND PAST POINTS OF INTEREST IN DIGITAL CONTENT

(71) Applicant: Google Inc., Mountain View, CA (US)

(72) Inventors: Daniel Chak, San Francisco, CA (US); Xinxing Gu, Santa Clara, CA (US); Virgil Scott King, Arlington, MA (US); C. J. Scott Dougall, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 383 days.

(21) Appl. No.: 14/634,852

(22) Filed: Mar. 1, 2015

(65) Prior Publication Data

US 2016/0253058 A1     Sep. 1, 2016

(51) Int. Cl.
*G06F 3/048* (2013.01)
*G06F 3/0483* (2013.01)
*G06K 9/32* (2006.01)
*G06K 9/00* (2006.01)

(52) U.S. Cl.
CPC ....... *G06F 3/0483* (2013.01); *G06K 9/00442* (2013.01); *G06K 9/3233* (2013.01)

(58) Field of Classification Search
CPC .............................. G06F 3/0483; G06F 3/0482
See application file for complete search history.

(56) References Cited

U.S. PATENT DOCUMENTS

| 5,786,805 A * | 7/1998 | Barry ................. G06F 3/04812 345/159 |
| 7,551,188 B2 * | 6/2009 | Ahokas ................. G06F 3/0485 345/684 |
| 8,725,565 B1 * | 5/2014 | Ryan ................. G06Q 30/0269 705/14.4 |
| 2008/0141117 A1 | 6/2008 | King et al. |
| 2009/0015568 A1 * | 1/2009 | Koski ................. G06F 3/04855 345/184 |
| 2012/0123889 A1 | 5/2012 | Mosquera |
| 2013/0179837 A1 * | 7/2013 | Eriksson ............... G06F 3/0482 715/823 |
| 2013/0305135 A1 | 11/2013 | Patterson et al. |

(Continued)

OTHER PUBLICATIONS

Sapling Learning, "Skim Mode," 2011-2015, 2 pages, [online] [retrieved on Oct. 28, 2015] Retrieved from the Internet <URL:www2.saplinglearning.com/help/skim•mode>.

(Continued)

*Primary Examiner* — Matthew Ell
(74) *Attorney, Agent, or Firm* — Shumaker & Sieffert, P.A.

(57) ABSTRACT

A client (e.g., an eReader) includes a reader application module for presenting content to a user of the client. The reader application module displays an interface including a plurality of pages of a digital content to a user of a client. The reader application module identifies a point of interest included in a page of the plurality of pages of the digital content and assigns a physics model to the identified point of interest. The physics model may be selected from a plurality of physics models based on a type of the point of interest. The reader application module receiving an interaction from the user wanting to skim through the plurality of pages of the digital content and applies the physics model responsive to receiving the interaction from the user.

19 Claims, 7 Drawing Sheets

(56) References Cited

U.S. PATENT DOCUMENTS

2014/0038154 A1 2/2014 Brownlow et al.
2014/0236772 A1 8/2014 McCoy et al.

OTHER PUBLICATIONS

Owen, L., "Google Play Books' new reading mode lets you browse and skim nonfiction ebooks faster," Knowingly, Inc., Oct. 30, 2014, 5 Pages.
PCT International Search Report and Written Opinion for PCT/US2016/013111, dated May 12, 2016, 13 Pages.
International Preliminary Report on Patentability dated Sep. 14, 2017, received in counterpart international application No. PCT/US2016/013111, 8 pps.

* cited by examiner

SKIMMING TO AND PAST POINTS OF INTEREST IN DIGITAL CONTENT

BACKGROUND

1. Field of the Invention

This invention pertains in general to electronic books and other digital content and in particular to providing digital content to users.

2. Description of the Related Art

Electronic books (e-books) have become increasingly popular among consumers. Users use electronic devices for example dedicated electronic readers (e-readers), tablet computers, and smart phones to read the e-books and maintain libraries of e-books. The user may be provided an interface via which the user may skim through the pages of the e-book being read by the user to more efficiently and easily move through and past large portions of the content. However, as a user skims through an e-book, a user may miss various points of interest located in the content of the e-book, for example notes, bookmarks, annotations, images, or highlights that the user may be interested in interacting with or viewing. Missing these points of interest may negatively impact the user's e-book experience.

SUMMARY

The above and other problems are addressed by a method and non-transitory computer-readable storage medium. An embodiment of the method comprises displaying an interface including a plurality of pages of a digital content to a user of a client. A further embodiment of the method also comprises identifying a point of interest included in a page of the plurality of pages of the digital content. A further embodiment of the method may also comprise assigning a physics model to the identified point of interest. The physics model may be selected from a plurality of physics models optionally based on a type of the point of interest. A further embodiment of the method also comprises receiving an interaction from the user with the interface and applying the physics model responsive to receiving the interaction from the user.

An embodiment of the non-transitory computer-readable storage medium comprises executable computer program instructions executable to perform steps comprising displaying an interface including a plurality of pages of a digital content to a user of a client. The steps also comprise identifying a point of interest included in a page of the plurality of pages of the digital content. In one embodiment, the steps comprise assigning a physics model to the identified point of interest. The physics model may be selected from a plurality of physics models based on a type of the point of interest. In one example, the physics model may be selected from a plurality of physics model based on the preferences of the user, characteristics of the user, characteristics of the e-book, characteristics of the publisher of the e-book, or the genre of the e-book. The steps further comprise receiving an interaction from the user with the interface and applying the physics model responsive to receiving the interaction from the user.

The above and other problems are addressed by a computing device. An embodiment of the computing device comprises a computer processor for executing computer program instructions and a non-transitory computer-readable storage medium storing computer program instructions. The instructions are executable to perform steps comprising displaying an interface including a plurality of pages of a digital content to a user of a client. The steps also comprise identifying a point of interest included in a page of the plurality of pages of the digital content. In one embodiment, the steps also comprise assigning a physics model to the identified point of interest. The physics model may be selected from a plurality of physics models based on a type of the point of interest. In one example, the physics model may be selected from a plurality of physics model based on the preferences of the user, characteristics of the user, characteristics of the e-book, characteristics of the publisher of the e-book, or the genre of the e-book. The steps further comprise receiving an interaction from the user with the interface and applying the physics model responsive to receiving the interaction from the user.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

The figures depict an embodiment of the invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
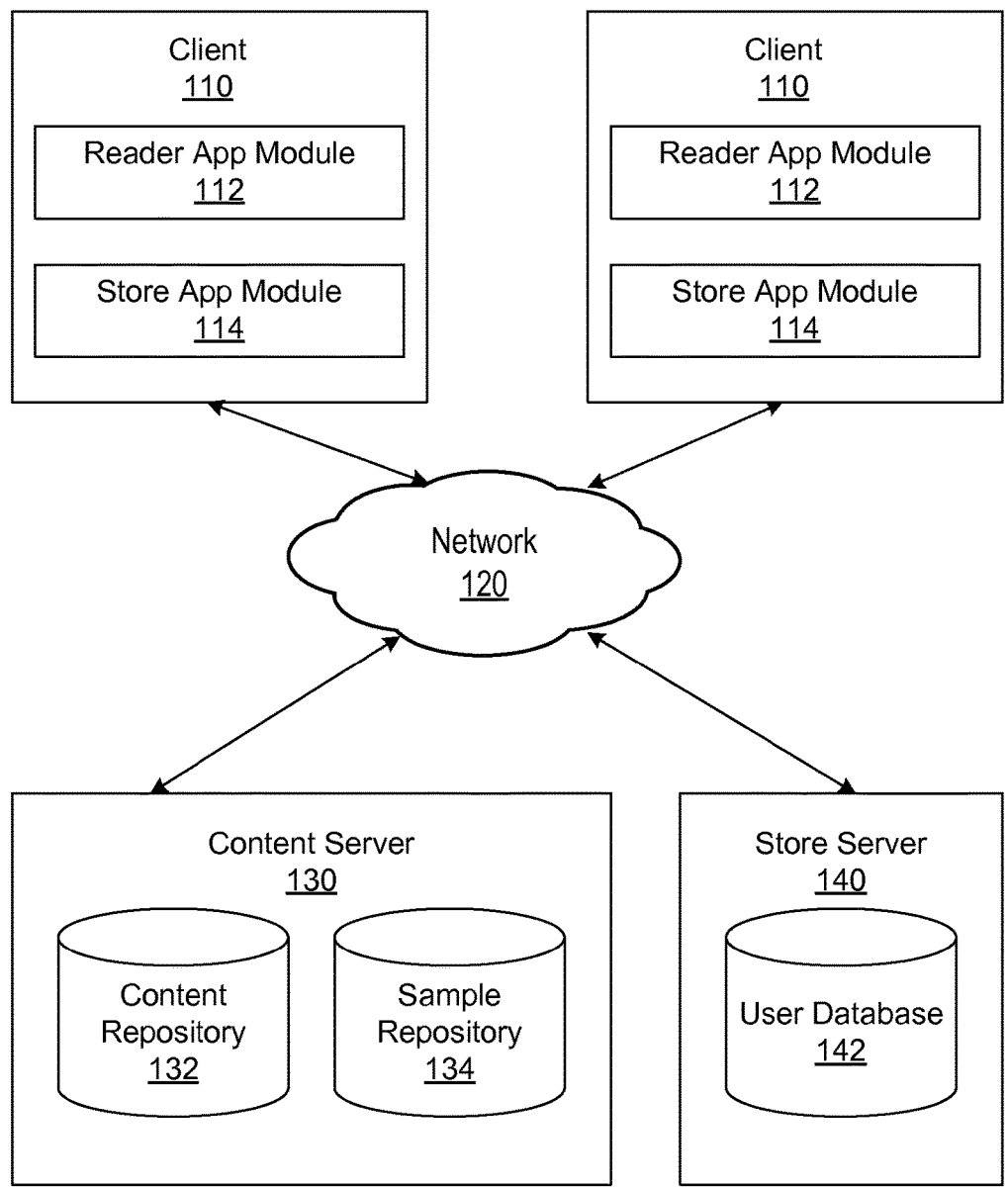
FIG. 1 is a high-level block diagram of a computing environment supporting presentation of digital content to a user for reading, according to one embodiment.

FIG. 1 is a high-level block diagram of a computing environment 100 supporting presentation of digital content to a user for reading, according to one embodiment. In this disclosure, "digital content" generally refers to any machine-readable and machine-storable expression, for example e-books, videos, and music files. In one embodiment, the computing environment 100 supports presentation of e-books to users via a skim interface for users to quickly skim through portions of the e-book. The skim interface may alert the user as the user approaches or skims past a point of interest (POI) in the e-book. In some embodiments, the skim interface arrives at a POI in an e-book and only moves past the POI upon receiving a form of confirmation from the user to move past the POI. The techniques described below can also be used with types of digital content other than e-books.

FIG. 1 illustrates a content server 130, a store server 140 and two clients 110 connected by a network 120. Only two clients 110, one content server 130, and one store server 140 are shown in FIG. 1 in order to simplify and clarify the description. Embodiments of the computing environment 100 can have many clients 110, content servers 130, and store servers 140 connected to the network 120. Likewise, the functions performed by the various entities of FIG. 1 may differ in different embodiments.

A client 110 is an electronic device used by a user to perform functions for example consuming digital content, executing software applications, browsing websites hosted by web servers on the network 120, downloading files, and interacting with the content server 130 and store server 140. For example, the client may be a dedicated e-reader, a smart phone, or a tablet, notebook, or desktop computer. The client 110 includes a display via which the user may view the text of e-books and other digital content as well as interact with content. In one embodiment, the client 110 includes a touchscreen that displays content to the user and with which the user can interact with by performing one or more gestures or actions with a pointer for example a stylus or a finger. A smartphone is one example of a client 110 where a user may interact with the display of the smartphone to consume content presented to the user. In addition, the client 110 may include a user interface (UI), for example physical and/or on-screen buttons, with which the user may interact to perform functions for example consuming digital content, selecting digital content, obtaining samples of digital content, and purchasing digital content.

The client 110 executes a reader application module 112 and a store application module 114. The reader application module 112 maintains a library of digital content and enables the user to consume the content, for example by displaying the text of an e-book on the display of the client 110. The store application module 114, in turn, enables the user to obtain e-books and other digital content via the network 120 and stores the content in the library. For example, the user can use the store application module 114 to obtain sample and full versions of e-books. Depending upon the embodiment, the reader application module 112 and store application module 114 may be standalone applications or integrated into the operating system or other software executing on the client 110. Further, the reader application module 112 and store application module 114 may both be integrated into the same application executing on the client 110.

The reader application module 112 may provide a variety of interfaces via which the user may interact with content for example an e-book. For example, the reader application module 112 may provide the user with a reading interface via which the user may read a single page of the e-book presented to the user and perform a consumption action to flip to the next page where subsequent content of the e-book is presented to the user. Further, the reader application module 112 may provide the user with a skim interface via which the user may skim through the e-book to efficiently move to different portions of the e-book and skim through the content of the e-book. A consumption action is an action performed by a user that is related to consuming the content being presented to the user, for example swiping across the display to move forward or backward through content or to skim forward and backward through content in the skim interface.

In one embodiment, the reader application module 112 establishes one or more points of interest (POI) at locations within the content of the e-book. A POI is a location in the content of the e-book with which the user may be interested in interacting, for example a bookmark, an annotation, an image, the boundaries of a chapter (e.g., the beginning or the end of a chapter in an e-book), or a purchase point. A purchase point is the point to which the user may read or skim the sample content without being charged, and once the user reads or skims past the purchase point, the reader application module 112 automatically purchases the e-book for the user and installs the full version of it on the client 112 as is further described in conjunction with U.S. patent application Ser. No. 14/580,056, filed on Dec. 22, 2014, which is hereby incorporated by reference in its entirety. An annotation may be a highlight, note, or other type of mark inserted into the content by a user or by other users who may have independently interacted with the content.

A POI may be used to alert the user and may also be used to receive confirmatory intents from the user. For example, in the event that the POI is a purchase point the reader application module 112 may alert the user that the user is arriving at the purchase point irrespective of whether the user is viewing the content via the skim interface or the reading interface. The reader application module 112 may only allow the user to move past the purchase point located in the sample content upon receiving a confirmatory consumption action representing the user's intent to purchase the full version of the content.

The reader application module 112 allows the user to quickly skim through an e-book by presenting to the user the content of the e-book via a skim interface. When the user is reading the e-book via the reader interface provided by the reader application module 112 a single page including content of the e-book as prepared by the reader application module may cover the entire screen of the client such that the edges of the screen generally correspond with the pages of a conventional book. Unlike the reader interface, the skim interface presents the user with multiple pages within the screen of the client 110. In one embodiment, the skim interface presented by the reader application module 112 includes a view frame. The view frame represents the multiple pages of the e-book or content presently being viewed by the user in the skim interface. The user may interact with the skim interface to skim through the content of an e-book.

In one embodiment, the reader application module 112 applies various physics models to interpret and handle consumption actions received from a user with respect to content presented to the user via the skim interface. The physics models may describe the whole environment of the skim interface and the way different aspects of the skim interface interact with one another. In one embodiment, the reader application module 112 may specify a change to an underlying physics model currently being applied by the reader application module 112. For example, the reader application module 112 upon determining that a page including a POI is approaching the view frame of the skim interface may temporarily increase the friction associated with the pages near the POI so as to allow the page including the POI to pass through the view frame relatively slowly compared to other pages thereby bringing the POI to the attention of the user. Further, the user may need to perform a consumption action imparting greater than the average amount of force to be able to skim past the page including the POI.

The reader application module 112 may apply various physics models or modify a physics model already being applied based on a page including a POI approaching, stopping at, or passing the view frame of the skim interface. For example, the reader application module 112 applies a standard physics model that causes the pages in the array to move through the view frame upon the skim interface receiving a consumption action from the user. As a page including a POI approaches the view frame the reader application module 112 may modify the standard physics model or may apply a different approach model such that the rate at which the pages move through the view frame of the skim interface gradually reduces as the POI approaches the view frame of the skim interface leading to the page including the POI being displayed to the user in the view frame of the skim interface.

In one embodiment, the reader application module 112 may apply different physics models based on the type of POI approaching or departing the view frame. For example, as the user skims through sample content presented to the user via the skim interface a page in the array of pages including a purchase point may approach the view frame of the skim interface. In order to prevent the user from inadvertently skimming past the purchase point and accidentally purchasing the full version of the content, the reader application module 112 applies an approaching physics model such that the rate at which the pages of the array move through the view frame gradually reduces until the page including the purchase point is present in the view frame of the skim interface and the user is alerted of having arrived at the purchase point. The reader application model 112 may apply a departing physics model that describes the characteristics of the consumption action performed by the user to move past the purchase point in the skim interface to purchase the content and to continue skimming through the content of the e-book located past the purchase point. For example, the departing physics model allows the user to purchase the full version of the content and to continue skimming through the content beyond the purchase point upon receiving a consumption action having greater than a threshold rate of motion across the display of the client 110, thereby departing greater than a threshold amount of energy to the array of pages. Alternatively, the departing physics model allows the user to depart the purchase point upon receiving greater than a threshold number of consumption actions, for example upon the user swiping twice across the display of the client 110 while interacting with the skim interface. Thus, the reader application module 112 prevents the user from accidentally moving past purchase points or other POIs in the skim interface by modifying the physics model applied while presenting content to the user via the skim interface.

The reader application module 112 interacts with the store application module 114 to support automatic purchasing of a full version of an e-book for a user based on the intent indicated by the user's continued reading of a sample version of the e-book. That is, the user's consumption action to turn the page of the e-book past the purchase point indicates the user's intent to purchase the full version of the e-book. The automatic purchasing of a full version of an e-book reduces the cognitive burden to the user of deciding when and whether to download and purchase an e-book. A user can start reading any book in a library of e-books without needing to decide whether to download a free sample of the e-book or purchase the full version. Selecting an e-book from the library takes a user directly into the sample version of the e-book; the user's continued reading through a purchase point in the sample version triggers the automatic purchase transaction without any interruption in the user's reading experience. Thus, the user may perform various actions for example purchasing content and skimming through content by using a single consumption action. This improves the user experience as the user may continue to perform a consumption action to consume the content of the e-book as well as purchase the full version of the e-book.

In one embodiment, the reader application module 112 establishes a "purchase point" within the sample content of the e-book. The user may read or skim the sample content up to the purchase point without being charged, and once the user reads or skims past the purchase point, the reader application module 112 automatically purchases the e-book for the user and installs the full version of it on the client 112. By the time the user reaches the end of the sample content, the full version of the content is available on the client 110 and the reader application module 112 can seamlessly transition the user to the full content. "Seamless," in this context, refers to a consistent and continuous transition from the sample version to the full version of the content, such that the transition is essentially unnoticeable by the user.

The location of the purchase point in the sample version of the content may vary. In one embodiment, the reader application module 112 establishes a location that minimizes time the user spends waiting for the full content to be installed on the client 110. For example, the purchase point may be located at an e-book several pages before the end of the sample content, so that the full versions of the content can be installed on the client 110 in the background while the user continues to skim the sample content.

In one embodiment, the reader application module 112 determines the location of the purchase point within the sample version of the content. In another embodiment, the location of the purchase point is determined by the content server 130, store server 140, or another entity. The entity that determines the location of the purchase point may specify the location by inserting a tag or other data into the sample version of the content that is interpreted by the reader application module 112 as the location of the purchase point. Similarly, the entity may specify the location of the purchase point within metadata associated with the sample version of the content. The reader application module 112 reads the metadata and establishes the purchase point at the specified location.

In one embodiment, the user skims the sample content via the skim interface provided by the reader application module 112 and passes the preselected purchase point in the sample, which activates the store application module 114. The store application module 114 instructs the store server 140 to retrieve purchase information associated with the user and to purchase the full version of the content for the user. After the purchase, the store application module 114 interacts with the reader application module 112 to cause the full version of the content to be installed in the user's library and seamlessly transition the user to the full version.

The content server 130 stores digital content and interacts with the reader application modules 112 of the clients 110 via the network 120 to provide the digital content to the clients. In one embodiment, the content server 130 stores a large amount of digital content from multiple publishers and distributors. The digital content may include e-books as well as other types of content for example movies and music.

In one embodiment, the content server 130 includes a content repository 132 storing full versions of content and a sample repository 134 storing samples of the full content. For example, the content repository 132 may store full versions of e-books while the sample repository 134 stores e-book samples associated with the full versions. Generally, a sample of digital content includes a subset of the content within the associated full version of the content, for example the first chapter of an e-book. Samples of digital content may be given to users by e-book publishers or distributors for free to entice the users to buy the full versions. In one embodiment, the e-book publishers designate portions of the digital content as free samples, and the distributor of the digital content may use their discretion as to whether and how to allow users to access the samples.

In one embodiment, the digital content in the content server 130, including the content in the content repository 132 and in the sample repository 134, is stored as a set of files and associated metadata. Each file is associated with particular content, for example a given e-book, and a single unit of content may be formed of one or more associated files. Further, in one embodiment the sample version of the content and the full version of the content are stored together in a single repository. For example, both versions of the content may be maintained together, except that the sample version of the content is unencrypted and the full version of the content is encrypted to prevent access to the non-sample parts of the content by users that have not purchased it.

The metadata for the files describe attributes of the content with which the files are associated. In one embodiment, the metadata include a volume identifier (ID) that is a string that uniquely identifies a given unit of content (e.g., an e-book). In addition, the metadata include a book format that defines the structure and semantics of the various components of an e-book for electronic publication. Examples of book formats include PDF (portable document format) and EPUB (electronic publication). The content of an e-book in PDF format is electronically published in a fixed-layout format. An e-book in EPUB format supports the publishing of the content in either fixed-layout format or flowable format.

The metadata may further include an "offer type" flag that distinguishes between full versions and sample versions of content. The metadata may also describe, for example, the title, author, publisher, and classification of the content. In one embodiment, the metadata of the full versions of the content in the content repository 132 and the metadata of the associated sample versions of the content in the sample repository 134 are substantially the same. Thus, the sample version of an e-book has the same volume ID as the full version of the book. However, the offer type flag of the metadata is set to different values depending upon whether a given file pertains to the full version or a sample version of the content.

The metadata associated with content may also include information describing POIs located in the content. For example, the metadata may include information describing the location of a purchase point included in the sample content. The purchase point may be established differently in different e-book formats. For example, if the e-book is in a fixed-layout format, the location of the purchase point may be specified at a fixed page within the e-book. If the user moves past that page, the user is considered to have intentionally purchased the full version of the e-book content. If the e-book is in a flowable format, the location of the purchase point may be specified at a particular word, paragraph, or other location within the content. If the user reads past a displayed page that contains the location of the purchase point, the user is considered to have intentionally purchased the full version of the e-book content.

The metadata may include information associated with different types of POIs included in the content. For example, a user viewing content via the reader application module 112 may via an interface specify the location of a bookmark at a particular location in the content. The reader application module 112 in turn may modify the metadata associated with the content to include information specifying the location of the bookmark in the content. In another example, the metadata associated with the content includes information identifying the location of figures, animations or other types of POIs the user may be interested in interacting with or viewing.

The store server 140 interacts with the store application modules 114 of the clients 110 and the content server 130 that provides digital content to the clients. The store server 140 may provide an online storefront that the user can browse using the client 110 to identify and obtain e-books and other content. For example, the storefront may allow users to purchase full and sample versions of content. The sample versions may be free or have a lower price than the full versions of the content.

In one embodiment, the store server 140 has a user database 142 which stores user profiles and purchase information associated with users registered with the store server 140. The purchase information of a user may include an identification of the user, payment method (e.g., a credit card), and/or other purchase information associated with the user (e.g., promotion codes, subscription membership). In one embodiment, the store server 140 registers a user responsive to the user selecting a free sample to read and obtains the purchase information from the user upon registration. Once a user is registered with the store server 140, the purchase information associated with the user is automatically retrieved from the user database 142 for automatic purchasing of full versions of content without further user input. In another embodiment, the purchase information associated with users is stored at the client 110. Responsive to a user reading past the preselected purchase point in the sample, the store application module 114 of the client 110 provides the purchase information associated with the user to the store server 140 for purchasing the full version of the content for the user.

The store server 140 also interacts with the store application modules 114 of the clients to process purchases of the full versions of content. In this instance, the store server 140 receives an indication that the user has passed the purchase point in a sample version of the content from store application module 114, retrieves identification, payment, and/or other purchase information associated with the user from the user database 142, and performs the purchase transaction for the full version of the content.

In one embodiment, the store server 140 maintains content libraries describing the content owned by users of the clients 110. The store server 140 accordingly updates its content library for a user to reflect that the user of the client has purchased the full version. The store server 140 also interacts with the content server 130 to cause it to provide the full version of the purchased content to the client 110.

When the store server 140 or other entities disclosed herein collect personal information about users, or makes use of personal information, the user may control whether programs or features collect user information (e.g., information about a user's social network, social actions or activities, a user's preferences, user's e-books, a user's current location in an e-book). In addition, certain data may be treated in one or more ways before it is stored or used, so that personally identifiable information is removed. For example, a user's identity may be anonymized so that no personally identifiable information can be determined for the user. Thus, the user may have control over how information is collected about the user and used by the store server 140 and/or other entities.

The network 120 enables communications among the clients 110, the content server 130 and the store server 140 and can comprise the Internet as well as mobile telephone networks. In one embodiment, the network 120 uses standard communications technologies and/or protocols. Thus, the network 120 can include links using technologies for example Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 120 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 120 can be represented using technologies and/or formats including the hypertext markup language (HTML), the extensible markup language (XML), etc. In addition, all or some of links can be encrypted using conventional encryption technologies for example secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
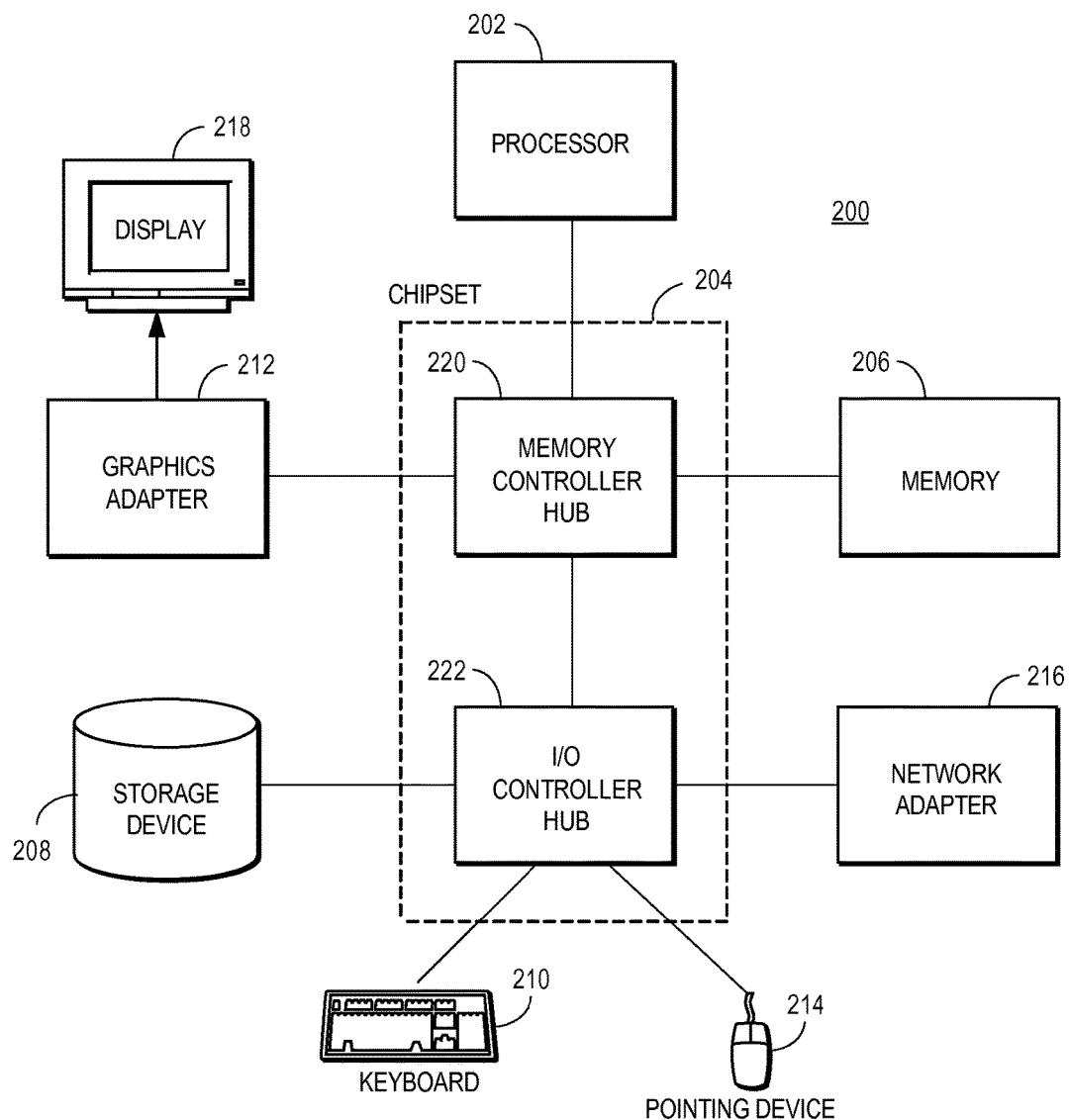
FIG. 2 is a high-level block diagram of a computer for acting as a client, a content server and/or a store server in one embodiment.

The entities shown in FIG. 1 are implemented using one or more computers. FIG. 2 is a high-level block diagram of a computer 200 for acting as a client 110, a content server 130 and/or a store server 140 in one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any non-transitory computer-readable storage medium, for example a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 120.

As is known in the art, a computer 200 can have different and/or other components than those shown in FIG. 2. In addition, the computer 200 can lack certain illustrated components. For example, the computers acting as the content 130 and/or store 140 servers can be formed of multiple blade servers linked together into one or more distributed systems and lack components for example keyboards and displays. Moreover, the storage device 208 can be local and/or remote from the computer 200 (for example embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Figure 3:
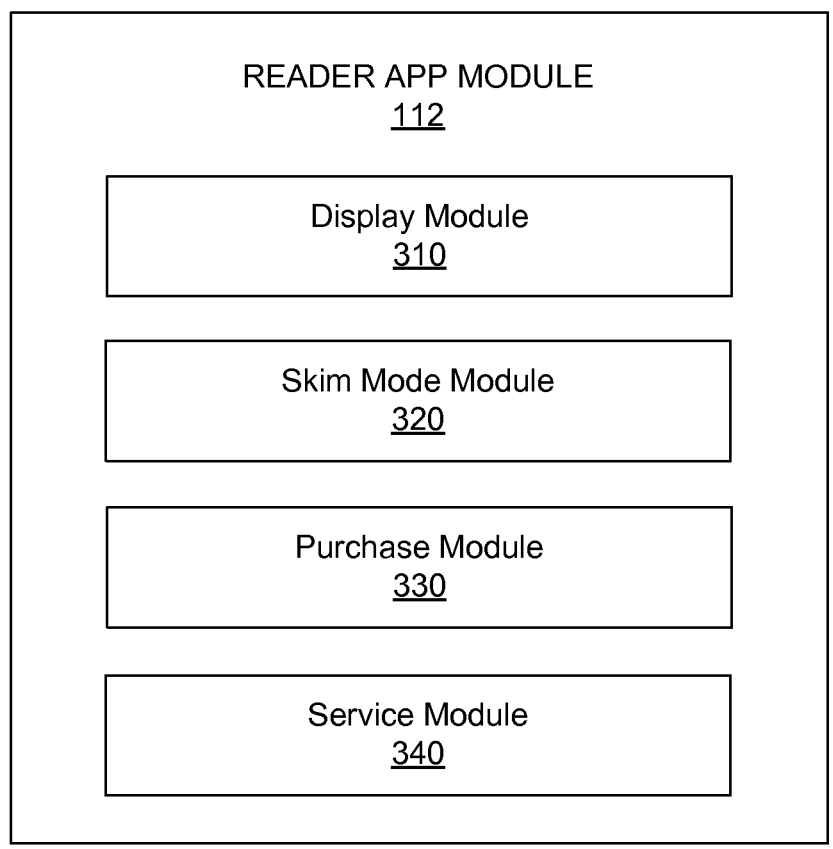
FIG. 3 is a high-level block diagram illustrating a detailed view of the reader application module of a client, according to one embodiment.

FIG. 3 is a high-level block diagram illustrating a detailed view of the reader application module 112 of a client 110 according to one embodiment. As shown in FIG. 3, the reader application module 112 includes a display module 310, a skim module 320, a purchase module 330 and a service module 340. Those of skill in the art will recognize that other embodiments of the reader application module 112 can have different and/or other modules than the ones described here, and that the functionalities can be distributed among the modules in a different manner.

The display module 310 displays digital content on the display device of the client 110. In one embodiment, the display module 310 displays pages of e-book text on the display device. In addition, the display module 310 displays UI elements, for example controls that allow the user to select and obtain content, input purchase information, and the like. The display module 310 also displays messages associated with the digital content, for example messages overlaid or adjacent to the digital content (e.g., in the margins of e-book content).

The skim module 320 provides the user with a skim interface via which the user may skim through the text or pages of an e-book presented to the user. A user may want to browse through the pages of an e-book to get a preview of the upcoming content in the book or may skim through pages of the e-book presented to the user to get from one point in the e-book to the next in a fast and efficient manner. The skim module 320 determines from the interactions received from the user with respect to the skim interface the portion of the e-book to skim to and a presentation of the skimming through the e-book to present to the user.

In one embodiment, the skim module 320 generates the skim interface and presents the user with multiple pages within the screen of the client 110. In one embodiment, the skim interface generated by the skim module 320 includes a view frame. The view frame represents the multiple pages of the e-book or content presently being viewed by the user in the skim interface. For example, the view frame is similar to when a camera viewing the pages of the e-book "pulls back" so that multiple pages of the e-book are visible within the screen of the client 110 when the user is presented the e-book via the skim interface. In one embodiment, in the skim interface the pages are presented as if each page is single-sided and aligned in an array facing up. The user may then page forward or backward through the book using a consumption action, which causes the view frame to move forward or backward in the array of pages thereby presenting different pages of the e-book to the user as the user skims through the pages in the array. Alternatively, the consumption action may cause the array of pages to move forward and backward through the view frame thereby displaying the user different portions of the array of pages via the view frame of the skim interface In one embodiment, the skim module 320 maintains an array of pages including the content of the e-book being viewed by the user. The skim module 320 populates the view frame of the skim interface with a portion of the array of pages, thereby presenting the user with multiple pages included in the array. In one example, the skim module 320 populates the view frame of the skim interface with a portion of the array of pages including the page at which the user is reading as the user launches the skim interface provided by the skim module 320. In other embodiments, the skim module 320 may maintain the content included in an e-book in different formats and present the content to the user via the skim interface in forms different than that of multiple pages being presented to the user within the screen of the client 110.

In one embodiment, the skim module 320 identifies one or more points of interest (POI) at locations within the content of the e-book. A POI is a location in the content of the e-book with which the user may be interested in interacting, for example a bookmark, an annotation, an image, a chapter boundary, or a purchase point. In one example, the skim module 320 identifies from the metadata associated with the content the pages of the content in which to include a POI.

The skim module 320 also monitors and interprets one or more actions received from the user with respect to the skim interface. For example, the skim module 320 responsive to receiving a consumption action with respect to the skim interface may move the array of pages forward or backward through the view frame of the user interface thereby allowing the user to skim through the various pages of the e-book presented to the user via the skim interface. As the user skims through the pages of the e-book, the skim module 320 may determine the current position if the user with respect to various locations within the content for example the location of one or more POIs.

In one embodiment, the skim module 320 applies various physics models to interpret and handle consumption actions received from a user with respect to content presented to the user via the skim interface. The "physics model" refers to a representation in which the displayed aspects of the e-book, for example the pages of the e-book, are imbued with physical characteristics (e.g., mass, friction, gravity etc.). The physics model describes how the aspects having these characteristics interact, particularly in response to actions performed by the user. For example, the skim module 320 interprets a consumption action performed by the user when viewing content via the skim interface as imparting energy or applying a force to the array of pages of the e-book presented to the user via the skim interface.

The physics models may describe the whole environment of the skim interface and the way different aspects of the skim interface interact with one another. For example, a physics model may describe the amount of energy, force, friction, acceleration, or other physical characteristic that is imparted by a consumption action, the type and value of a physical characteristic (e.g., mass, friction, electric charge, elasticity, inertia etc.) associated with each page of the e-book presented to the user via the skim interface, and a type of physical object (e.g., a spring, magnet, ticker, etc.) associated with the view frame of the skim interface. Further, the physics model also describes how the different aspects interact with one another causing the array of pages of the e-book to move through the view frame of the skim interface. For instance, the physics model may interpret a consumption action as imparting force on the array of pages of the e-book. The physics model may gradually increase the weight associated with the pages in the array of the e-book as one goes further down the array of pages from the view frame of the user and the skim interface. The physics model may further associate with a page including a POI a relatively high weight compared to the pages prior to or past the page including the POI. The physics model may associate a spring with the view frame of the skim interface, and the spring may be configured to only interact with the page including the POI. Thus, as the user performs a consumption action while interacting with the skim interface an amount of force is imparted on the array of pages of the e-book maintained by the skim module 320 causing the array of pages to accelerate through the view frame at first and decelerate over time as the weights associated with the pages in the array gradually increase. As the page including the POI approaches the view frame the deceleration of the pages moving through the view frame may increase dramatically. Further, the page including the POI upon entering the view frame interacts with the spring associated with the view frame, as described by the physics model, and may promptly bounce back from the edge of the view frame and slowly come to rest. Thus, the physics model applied may describe the whole environment of the skim interface and the way different aspects of the skim interface interact with one another.

In one embodiment, the skim module 320 may specify a change to an underlying physics model currently being applied by the skim module 320. For example, the reader application module 112 upon determining that a page including a POI is approaching the view frame of the skim interface may temporarily increase the friction associated with the pages in the array near the POI so as to allow the page including the POI to pass through the view frame relatively slowly compared to other pages in the array thereby bringing the POI to the attention of the user. Further, the user may need to perform a consumption action imparting greater than the average amount of energy or force to be able to skim past the page including the POI. The skim module 320 may apply different physics models based on a page including a POI approaching, arriving at, or passing the view frame of the skim interface. The various models applied by the skim model 320 in response to receiving consumption actions with the skim interface are further described in conjunction with FIG. 4 below.

The purchase module 340 interacts with the store application module 114 in the client 110 to purchase content. The purchase module 340 may use an API to provide the store application module 114 with the volume ID of the sample content and the user ID of the user of the client and indicate that the store application module 114 should retrieve the purchase information associated with the user from the user database 142 and perform a purchase transaction for the full version of the content.

Assuming the client 110 is online and the user performs a consumption action to skim beyond the purchase point in the sample content, the purchase module 340 interacts with the store application module 114 in the client 110 to purchase of the full version of the content. The purchase module 340 may use an API to provide the store application module 114 with the volume ID of the sample content and the user ID of the user of the client and indicate that the store application module 114 should retrieve the purchase information associated with the user from the user database 142 and perform a purchase transaction for the full version of the content.

In one embodiment, the store application module 114, once activated, retrieves the purchase information associated with the user and processes the purchase transaction. This processing may involve sending a purchase notification to the store server 140 that includes the purchase information, along with additional information used for the purchase, for example the volume ID, offer type, and other metadata identifying the purchased content. The store server 140 performs the transaction and communicates the result (e.g., "success" or "fail") to the store application module 114. In turn, the store application module 114 communicates the result of the transaction to the user of the client 110.

The service module 350 transitions the user of the client 110 from the sample version to the full version of the content responsive to a successful purchase transaction. The service module 350 receives the full version of the content downloaded from the content server 130 to the client 110. The service module 350 can receive the downloaded content using a variety of different techniques. In one embodiment, the store server 140, upon processing the successful purchase transaction, instructs the content server 130 to download the content to the client 110. For example, the store server 140 may instruct the content server 130 to engage in a synchronization process with the client 110, which causes the reader application module 112 of the client 112 to synchronize its library of digital content with the library of content owned by the user stored by the store server 140. The client 110 downloads the full version of the content as a result of the synchronization. In another embodiment, the service module 350 directly downloads the full version of the content from the content server 130 responsive to the successful purchase transaction. In another embodiment, the service module 350 receives decryption keys or other decryption information from the content server 130 or another source which the service module 350 then uses to decrypt the full version of the content.

Once the full version of the content is on the client 110, the service module 350 replaces the sample version of the content at the client with the full version using a variety of techniques. In one embodiment, the service module 350 saves the full version of the content in the user's library on the client, determines the user's current reading position in the sample version, switches the user to the same reading position in the full version, and deletes the sample version from the user's library. The service module 350 may switch the user to the full version by instructing the display module 310 to display the full version of the content instead of the sample version after the end of sample version. In another embodiment, the service module 350 overwrites the sample version with the full version of the content, which automatically causes the display module 310 to display the full version of the content.

Regardless of the technique used for the transition, the transition is typically not noticeable to the user. Since the user can skim through the remaining content in the sample version while the transition to the full version occurs, the user's skimming is not interrupted after the user passes the purchase point. If the user does exceed the scope of the sample content by, e.g., rapidly skimming through the sample content, an embodiment of the service module 350 displays a "loading" page or other message indicating that the content is being retrieved.

Figure 4:
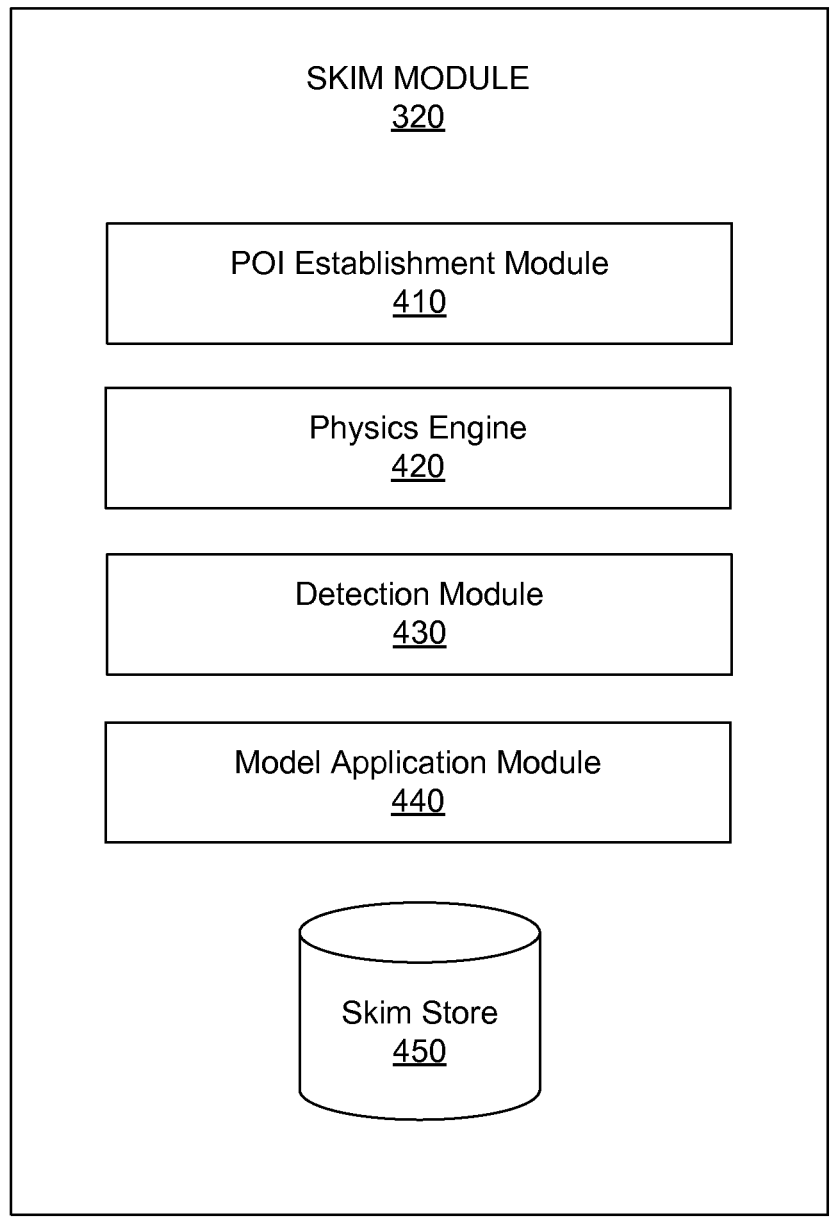
FIG. 4 is a high-level block diagram illustrating a detailed view of the skim module, according to one embodiment.

FIG. 4 is a high-level block diagram illustrating a detailed view of the skim module 320, according to one embodiment. As shown in FIG. 4, the skim module 320 includes a skim store 405, POI (point of interest) establishment module 410, a physics engine 420, a position detection module 430, and a model application module 440. Those of skill in the art will recognize that other embodiments of the skim module 320 can have different and/or other modules than the ones described here, and that the functionalities can be distributed among the modules in a different manner.

The skim store 405 includes one or more physics models that may be applied by the skim module 320 as the user skims through content via the skim interface. Different physics models may describe different aspects of the skim interface having different physical characteristics and interacting with each other differently. For example, one physics model associates a mass with each page of the array of pages presented to the user via the skim interface, while another physics model associates a friction value with each page of the array presented to the user via the skim interface. A third physics model may describe the consumption action performed by the user as imparting energy or a force to the array of pages based at least in part on the rate at which the user performs the consumption, for example the rate at which the user swipes across the display of the client 110 while interacting with the skim interface. Each model may be associated with an identifier identifying the physics model.

In one embodiment, each model stored in the skim store 405 may be associated with a type of POI. For example, a first model may be associated with the purchase point type of POI, while a second model may be associated with an annotation type POI. The skim store 405 may maintain associations between identifiers identifying physics models and types of POIs. Apart from including information associating a physics model with a type of POI, the skim store 405 may also include information associated with POIs included in different digital content, for example an e-book the user is currently reading. For example, the skim store 405 includes information identifying the location of a POI in an e-book.

Further, the skim store 405 may include additional information describing a POI. For example, the skim store 405 includes information identifying the type of POI included in the e-book, the number of times and location at which the POI occurs in the e-book (for example the page of the e-book including the POI), and a weight associated with the POI. The weight associated with the POI identifies the extent to which a physics model applies one or more physics characteristics to the page of the e-book including the POI. For example, the higher the weight associated with the POI the higher the mass value or friction value that is associated with the POI by the physics model, thereby resulting in the user having to impart greater amounts of energy to skim past the POI. By associating a weight with each POI stored in the skim store 405, the skim module 320 is able to describe different behaviors associated with the different aspects of the skim interface while applying fewer physics models.

As different physics models may be applied and associated with different POIs each physics model associated with a POI describes how the page including the POI, or pages located near the POI, interacts with other aspects of the skim interface, for example the view frame. In one embodiment, the skim store 405 includes a set of approach physics models describing the different physical characteristics associated with the aspects of the skim interface and the way they interact with one another as a page including a POI approaches the user's current position or the view frame.

In one embodiment, the skim store 405 includes a damper approach model that brings the page including the POI to a complete stop in the view frame. For example, the damper approach model may associate with the page including the POI a mass value while only associating a friction value with the other pages in the array of pages of the e-book maintained by the skim module 320. Further, the damper approach model associates the view frame with a damper acting in the direction opposite to the movement of the array of pages through the view frame and configured to act specifically on the mass associated with the page including the POI. Thus as the page including the POI enters the view frame and interacts with the damper associated with the view frame the array of pages is brought to a complete stop with the page including the POI being presented to the user via the view frame. The rate at which the page including the POI and the array of pages comes to a complete stop depends on the value of the mass associated with the page including the POI and the characteristics of the damper associated with the view frame of the skim interface. The damper approach model may be associated with a purchase point type of POI thereby bringing the page including the purchase point to a complete stop in the view frame and alerting the user that if the user performs an additional consumption action the user is confirming purchase of the full version of the content.

In another embodiment, the skim store 405 includes a spring approach model that causes the page including the POI to bounce off an edge of the view frame. For example, the spring approach model may associate with the page including the POI a mass value while only associating a friction value with the other pages in the array of pages of the e-book maintained by the skim module 320. Further, the spring approach model associates the view frame with a spring acting in the direction opposite to the movement of the array of pages through the view frame and configured to act specifically on the mass associated with the page including the POI. Thus, as the page including the POI enters the view frame and interacts with the spring associated with the view frame the array of pages bounces backwards alerting the user that the user arrived at the page including the POI. The spring approach model may be associated with a purchase point type of POI, an image or video type of POI, a bookmark type of POI or any other type of POI.

In yet another embodiment, the skim store 405 includes a magnet approach model that causes the page including the POI to slow down as it passes through the view frame and in some cases snap back into the view frame once it has passed it. For example, the magnet approach model may associate with the page including the POI a magnetic or electric charge value. Further, the magnet approach model associates the view frame with a magnet acting in the direction opposite to the movement of the array of pages through the view frame or from a position at the bottom of the view frame and configured to act specifically on the charge associated with the page including the POI. Thus, as the page including the POI enters the view frame and interacts with the magnet associated with the view frame the array of pages and the page including the POI slows down as they pass through the view frame bringing the POI to the attention of the user. In some cases, depending on the characteristics of the magnet, the value of the charge associated with the page including the POI and the current rate at which the page including the POI enters and passes through the view frame, the page including the POI may pass through the view frame at a slow rate and snap back into the view from for the user to again view. The magnet approach model may be associated with various kinds of POI.

In a fourth embodiment, the skim store 405 includes a ticker approach model that causes the page including the POI to gradually slow down as it enters the view frame and passes through the view frame. For example, the ticker approach model may associate with the pages of the array preceding the page including the POI and with the page including the POI different friction values. The friction value may increase as the pages near the page including the POI. Further, the ticker approach model associates with the view frame the physical characteristic of removing a fixed amount of energy associated with the array of pages based on the friction value associated with each page as it passes through the view frame. Thus, as the pages preceding the page including the POI and the page including the POI enter the view frame and interact with the view frame the array of pages decelerates at an increasing amount as each page enters the view frame. The ticker approach model may be associated with any type of POI as well.

Apart from storing a set of approach physics models, the skim store 405 also stores a set of departing physics models. The departing physics models describe the different physical characteristics associated with the aspects of the skim interface and the way they interact with one another as a page including a POI departs the user's current position or the view frame. Thus, different departing physics models may make it easier or harder for a user to depart a page including a POI by performing a consumption action.

In one embodiment, the skim store 405 includes departing physics models that modify the underlying values of the different types of approach models, i.e., the damper model, the spring model, the magnet model, and the ticker model. The departing physics models may modify the underlying values of the different types of models being increasing the values of the physical properties imbued by the different types of models to make it more difficult for a user to depart a page including a POI by performing a consumption action or vice versa. For example, the departing physics model may increase the mass, charge, or friction value associated with the page including the POI, such that the user has to impart greater energy to the array of pages by performing a more vigorous consumption action (for example swiping across the display of the client 110 at a greater speed) to be able to move the page including the POI past the view frame and to continue skimming through the different pages of the e-book. This may be particularly helpful in the case of the POI included in the page being a purchase point. As the user views the page including the purchase point via the view frame, the consumption action performed by the user to move past the purchase point and confirm the purchase of the full version of the content may have to impart more energy to the array of pages for the user to be able to skim past the purchase point and confirm purchase of the e-book. In other embodiments, apart from modifying the underlying values of the approach physics models the departing physics models may be similar to those of the approach physics models but may include different values associated with the physical characteristics of the different aspects of the skim interface.

In one embodiment, the departing physics models may include multiple consumption actions to be performed for the user to depart a page including a POI. For example, a user may perform two consumption actions within a given time period to depart the page including the POI. In one instance the departing physics model may describe a first set of physical properties being associated with the different aspects of the skim interface for the first consumption action and a second set of physical properties being associated with the different aspects of the skim interface for the second consumption action. For example, a departing physics model may, for a first consumption action, associate with the view frame a magnet with a very high magnetic strength, and associate with the page including the POI a very high charge value. The departing physics model may for the second consumption action associate with the view frame a magnet with a very low magnetic strength, and associate with the page including the POI a very low charge value. Thus, upon receiving the first consumption action performed by the user, the page including the POI does not move past the view frame, but upon receiving the second consumption action performed by the user within a given time period of the first, the user is able to depart and skim past the page including the POI.

Each of the different approach physics models and departing physics models may be applied at different times as the user skims through the pages of the e-book and may be applied to and associated with different portions of the array of pages of the e-book, particularly with different pages including different POIs. Further, each physics model may apply different physical characteristics to the different aspects of the skim interface based on the weight associated with the POI to which the physics model is being applied or with which the physics model is associated.

The POI establishment module 410 identifies POIs in content to be presented to the user. POIs may be specified by readers of content, for example users reading an e-book or by publishers of content, for example publishers providing sample content to the users. As mentioned above, a POI is a location in the content of particular interest to the user reading the content, for example a bookmark identifying a location in the content at which the user previously stopped reading, a purchase point identifying a location in the content beyond which the user has to purchase the content to continue to consume the content, or an annotation, for example a highlight, note, or other type of mark inserted into the content by a user or by other users who may have independently interacted with the content. In one embodiment, the POI is a purchase point located before the end of the sample content, which allows the user to purchase the full version of the content by reading past the purchase point and then continue to read the sample content (which is already installed on the client 110) while the full version is downloaded from the content server 130 to the client, decrypted, or otherwise prepared for reading. In some embodiments, the skim store 405 includes a standard physics model. The standard physics model being the physics model that is applied when the skim interface is first launched, entered, or presented to the user.

The POI establishment module 410 determines locations in the content presented to the user via the skim interface at which POIs associated with the content are located. In one embodiment, the POI establishment module 410 determines from the metadata associated with the content the locations in the content at which to establish the POIs. For example, the POI establishment module 410 identifies a location in the sample content to be presented to the user at which to establish a purchase point based on the metadata associated with the sample content. In another example, the POI establishment module 410 identifies a location in content to be presented to the user at which a bookmark type of POI is located based on the metadata associated with the content.

The metadata associated with the content may be modified by a user or by a provider of the content. For example, a user reading the content via the reader application module 112 may place a bookmark at a particular location in the content the user is interested in visiting again at a later time via a user interface provided by the reader application module 112. The reader application module 112 modifies the metadata associated with the content to include the bookmark as a POI and the location of the bookmark in the content. In another example, a provider of sample content includes in the metadata associated with the sample content the location in the sample content of a purchase point.

In one embodiment, the POI establishment module 410 upon identifying a POI in the content to be presented to the user determines a page of the content in which to include the POI. For example, the POI establishment module 410 determines from the metadata associated with the POI a particular location in the text of the content of an e-book at which the POI is located. The POI establishment module 410 may identify the page of the formatted e-book including the text so as to include the POI in the identified page of the formatted e-book.

The POI establishment module 410 may also determine a location at which to a POI is located based on user input received from the user. For example, the user may enter via an interface provided by the reader application module 112 a search query for one or more words in the content presently being read by the user. The POI establishment module 410 identifies locations in the content including the words, for example one or more pages of the e-book including the words. In some embodiments, there are a plurality of POIs and different types of POIs, for example bookmarks or purchase points, included in content presented to a user.

In one embodiment, the POI establishment module 410 infers from the content in an e-book the location of one or more POIs in the e-book. For example, the POI establishment module 410 may identify pages in an e-book at which a chapter is beginning or ending and identifies the pages as a location of a POI. In another example, the POI establishment module 410 identifies locations in the e-book that are likely to be of interest to a user, based on one or more preferences associated with the user. For instance, the user may have expressed a preference for a particular football team. The POI establishment module 410 infers the location of a POI in an e-book by identifying the location of content in the e-book associated with the particular football team. The POI establishment module 410 may store the inferred location of a POI in the metadata associated with the content.

In one embodiment, the POI establishment module 410 uses the characteristics associated with the user's client to determine the amount of time likely required to download the full version of the content to the client, decrypt the full version of the content, or otherwise prepare the full version for reading via the reader application module 112. The POI establishment module 410 also determines the rate at which the user consumes content based at least in part on characteristics associated with the user. Then, the POI establishment module 410 selects a location for the purchase point in the sample content such that the user will reach the end of the content included in the sample content at approximately the same time, or a specified amount of time after, the full version of the content is retrieved and prepared for reading.

The physics engine 420 monitors user actions received by the user with respect to the skim interface and determines the behavior of the different aspects of the skim interface based on one or more physics models that have been selected to be applied by the model application module 440 for example. The physics engine 420 determines from the model currently being applied to the different aspects of the skim interface the different physical characteristics to associate with the different aspects of the skim interface and the way the different aspects of the skim interface interact with each other based on their associated physical characteristics. For example, the physics engine 420 identifies the physics model currently being applied and retrieves information associated with the model from the skim store 405. The physics engine 420, based on the retrieved information, associates a mass value with each of the pages in the array of pages of the e-book (maintained and prepared by the skim module 320) that includes a POI. The physics engine 420 may identify the mass value to associate with each page including a POI based on the weight associated with the POI as determined from information associated with the POI in the skim store 405. The physics engine 420, based on the retrieved information, associates with the view frame a damper established in the direction opposite to the movement of the array of pages through the view frame. Further, the physics engine 420 based on the retrieved information, determines that the consumption action performed by the user imparts energy on the array of pages of the e-book maintained by the skim module 320 resulting in the acceleration or deceleration of pages through the view frame of the skim interface. The amount of energy imparted may also be specified by the information associated with the physics model, and can be determined based on for example, the rate at which the user performs the consumption action.

The physics engine 420 upon receiving a consumption action with the skim interface, imparts energy to the array pages, based on the consumption action, thereby causing the array of pages to accelerate through the view frame in the direction determined from the consumption action. As a page including a POI approaches the view frame the physics engine 420 determines how and to what extent the damper associated with the view frame and the mass value associated with the page including the POI interact with one another based on the physics model. For example, the physics engine 420 determines the rate at which the page including the POI comes to a halt in the view frame upon entering the view frame and interacting with the damper associated with the view frame based on characteristics associated with the damper of the view frame and the mass value associated with the page including the POI. Thus the physics engine 420 presents the movement of the array of pages through the view frame of the skim interface based on the different ways the different aspects of the skim interface interact with one another as described by an underlying physics model being interpreted and applied by the physics engine 420.

The position detection module 430 monitors the user's consumption of the content presented to the user via the skim interface and the distance between the user's current position with respect to the content presented to the user via the skim interface and the location of a POI in the content. In one embodiment, the skim module 320 maintains an array of pages of an e-book and the user skims through the array of pages via the skim interface, viewing multiple pages included in a portion of the array of pages via the view frame of the skim interface. The position detection module 430 determines when the user's current position is approaching that of the location of a POI in the content based on the distance of the page including the POI from the view frame of the skim interface. For example, the position detection module 430 determines that the user's current position is approaching a POI upon identifying that the page in the array of pages including the POI is less than a threshold number of pages away from the view frame of the skim interface. In another example, the position detection module 420 determines from information associated with the page including the POI generated by the physics engine 420 (for example the current rate at which the page including the POI is moving), whether a user's current position is approaching the location of the POI. For instance, the position detection module 420 determines from the current rate at which the page including the POI is moving whether the page including the POI is approaching the view frame of the skim interface.

In other embodiments, the position detection module 440 may use different techniques to determine whether the user's current position with respect to the content presented to the user via the skim interface is approaching a POI located in the content. Further, the position detection module 430 may use similar techniques to determine if a user's current position is moving past a POI located in the content. For example, the position detection module 430 determines that a page in the array of pages including a POI is departing the view frame of the skim interface.

The position detection module 430 may perform one or more actions upon determining that the user is approaching a POI in the content presented to the user via the skim interface. For example, the position detection module 430 responsive to detecting that the user is approaching a purchase point while skimming through the content via the skim interface interacts with the display module 310 to display messages related to the purchase point to the user. Further, the position detection module 430 may display messages to the user upon detecting that the user is approaching, has arrived at, is passing, or is departing a POI located in the content while skimming through the content using the skim interface.

The position detection module 430 may display messages to the user indicating that the user is approaching, has reached, and/or is past the purchase point or any other POI. The message may be ambient in the sense that the messages are unobtrusive and do not interfere with the user's consumption of the digital content. For example, the position detection module 430 may display messages in the margins of e-book content indicating the distance between the user's current reading position and the location of the purchase point, e.g., "5 pages until purchase point," and "last page before the purchase point." Optionally, the display module 310 may also display message indicating the completion of the purchase of the full version of the content, e.g., "It's your book now. Enjoy!" Further, the position detection module 430 may display messages in the negative space of the view frame of the skim interface. The negative space of the view frame refers to the portions of the view frame not including any objects of the skim interface, for example the portions of the view frame not covered by the pages displayed to the user via the view frame. The negative space may be located between pages, above pages, or below pages viewed the user via the view frame of the skim interface. Other embodiments may display different messages or messages in a different medium, e.g., audio messages, or causing the user's client to vibrate with respect to different types of POIs.

Apart from displaying messages to the user the position detection module 430 may display other forms of alerts to indicate to the user that the user is approaching, has reached, and/or is past a POI. For example, the position detection module 430 may gradually change the color or hue of the negative space surrounding the pages in the view frame as a user approaches a POI. In another example, the position detection module 430 may bring the page including the POI to the foreground and dim the remaining portions of the view frame, thereby bringing to the attention of the user the POI included in the page of the e-book. In a third example, the position detection module 430 may display patterns, colors, or icons in the margins of the pages of the e-book or the negative space of the view frame upon determining that the user's current position is approaching, arrived at, or moving past a POI included in the content presented to the user. As, stated above, the position detection module 430 may display different kinds of messages, colors, icons, or patterns based on the type of POI approaching, arriving at, or departing the view frame of the skim interface.

The position detection module 430 may perform different actions as the user moves beyond a POI. For example, responsive to the user skimming past the purchase point, the position detection module 430 activates the purchase module 340 to purchase the full version of the content for the user. In one embodiment, the position detection module 430 may use an application programming interface (API) to activate the purchase module 340.

The position detection module 430 may also monitor the client status, e.g., online or offline, in combination with the user's skimming position and the purchase point. For example, if the user approaches and then skims past the purchase point in sample content while the client is offline (i.e., not in communication with the content server 130 and store server 140), the detection module 430 may instruct the display module 310 to display a message informing the user that the user has purchased the content, but will have limited skimming capability until the client is online, e.g., "only part of this book has been downloaded. Read online to download the entire book."

The model application module 440 identifies one or more physics models to apply to the different aspects of the skim interface, thereby determining the movement and presentation of pages through the view frame of the skim interface. By determining a physics model to apply the model application module 440 describes how different aspects of the skim interface (i.e., the pages of the e-book, the view frame, and the consumption action) interact with one another as the user skims through the pages of the e-book presented to the user via the skim interface.

In one embodiment, the model application module 440 retrieves one or more models from the skim store 405 and instructs the physics engine 420 to apply the physics models during the course of the user interacting with the skim interface. For example, responsive to the user first entering the skim interface the model application module 440 retrieves a standard physics model from the skim store 405 and instructs the physics engine 420 to apply the standard physics model.

In one example, the model application module 440 assigns to each POI included in the content one or more physics models. For example, the model application module 440 identifies the type and location associated with each POI in the content of the e-book from the skim store 405. The model application module 440 retrieves one or more physics models associated with the identified types of POI and assigns one or more of the retrieved physics models to each POI in the content of the e-book. For example, the model application module 440 identifies that the sample content being presented to the user includes a purchase point and retrieves an approach model and a depart model from the skim store 405 and assigns the approach model and depart model to the identified purchase point. The model application module 440 may store the assignment of a physics model to a POI included in the content of the e-book in the skim store 405.

The model application module 440 may apply one or more of the physics models assigned to the POI as the user skims through the pages of the e-book via the skim interface. In one embodiment, the model application module 440 may determine from the position detection module 430 that a page including a POI is approaching the view frame of the skim interface. The model application module 440 may communicate instructions to the physics engine 420 to apply the approach model assigned to the POI included in the page approaching the view frame. By applying an approach model the model application module 440 may instruct the physics engine 420 to either modify an underlying model currently being applied by the physics engine 420 to include the characteristics of the approach model or to stop applying the underlying model and to proceed with applying the approach model.

In another embodiment, the model application module 440 may determine from the position detection module 430 or the physics engine 420 that the user is currently viewing the page including the POI via the view frame of the skim interface, in that the page including the POI has come to a full stop within the view frame and the user is aware of the POI included in the page. The model application module 440 may communicate instructions to the physics engine 420 to apply the departing physics model assigned to the POI included in the page present the view frame. By applying the departing physics model the model application module 440 may instruct the physics engine 420 to either modify an underlying model currently being applied by the physics engine 420 to include the characteristics of the departing physics model or to stop applying the underlying model and to proceed with applying the departing physics model.

Figure 5A:
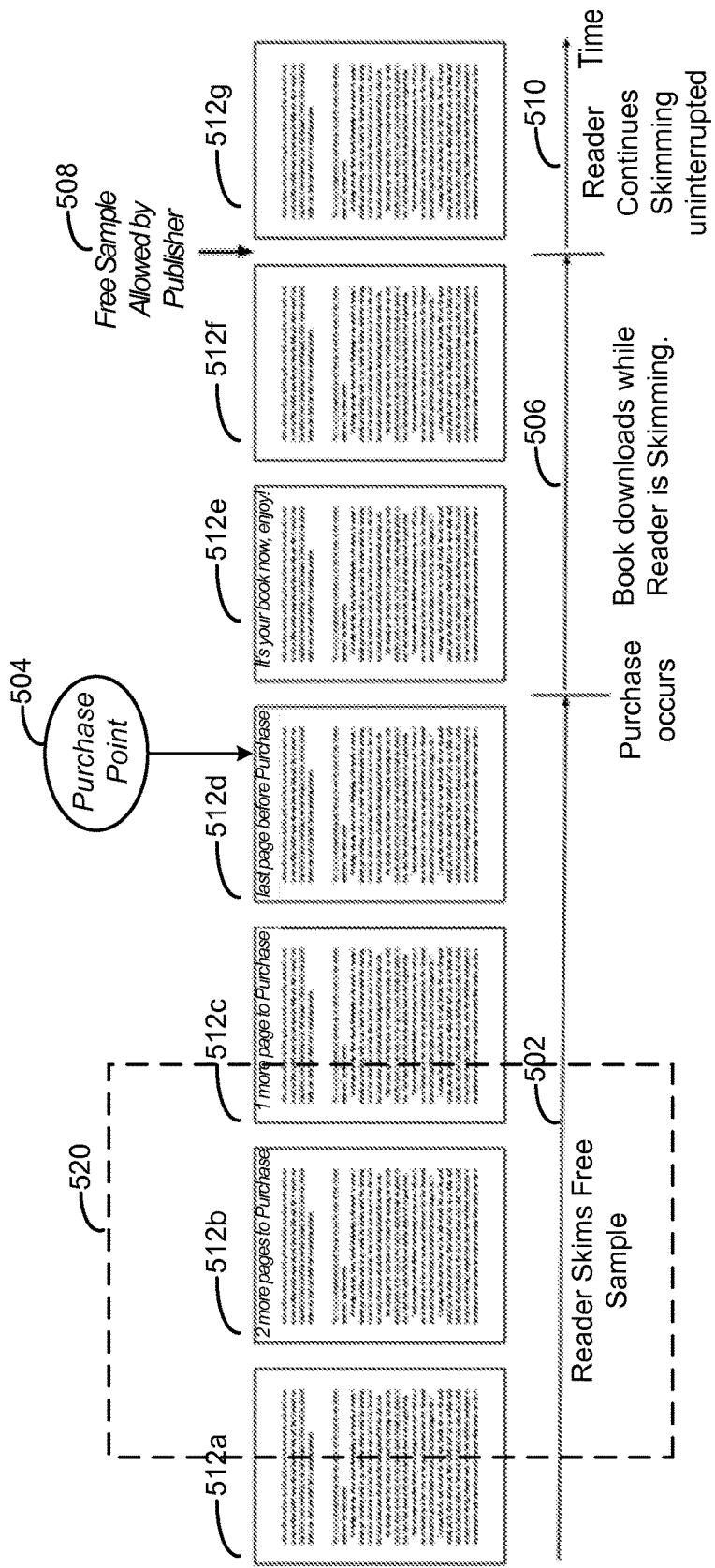
FIG. 5A is a diagram of a user skimming through sample content by interacting with the skim interface, according to one embodiment.
Figure 5B:
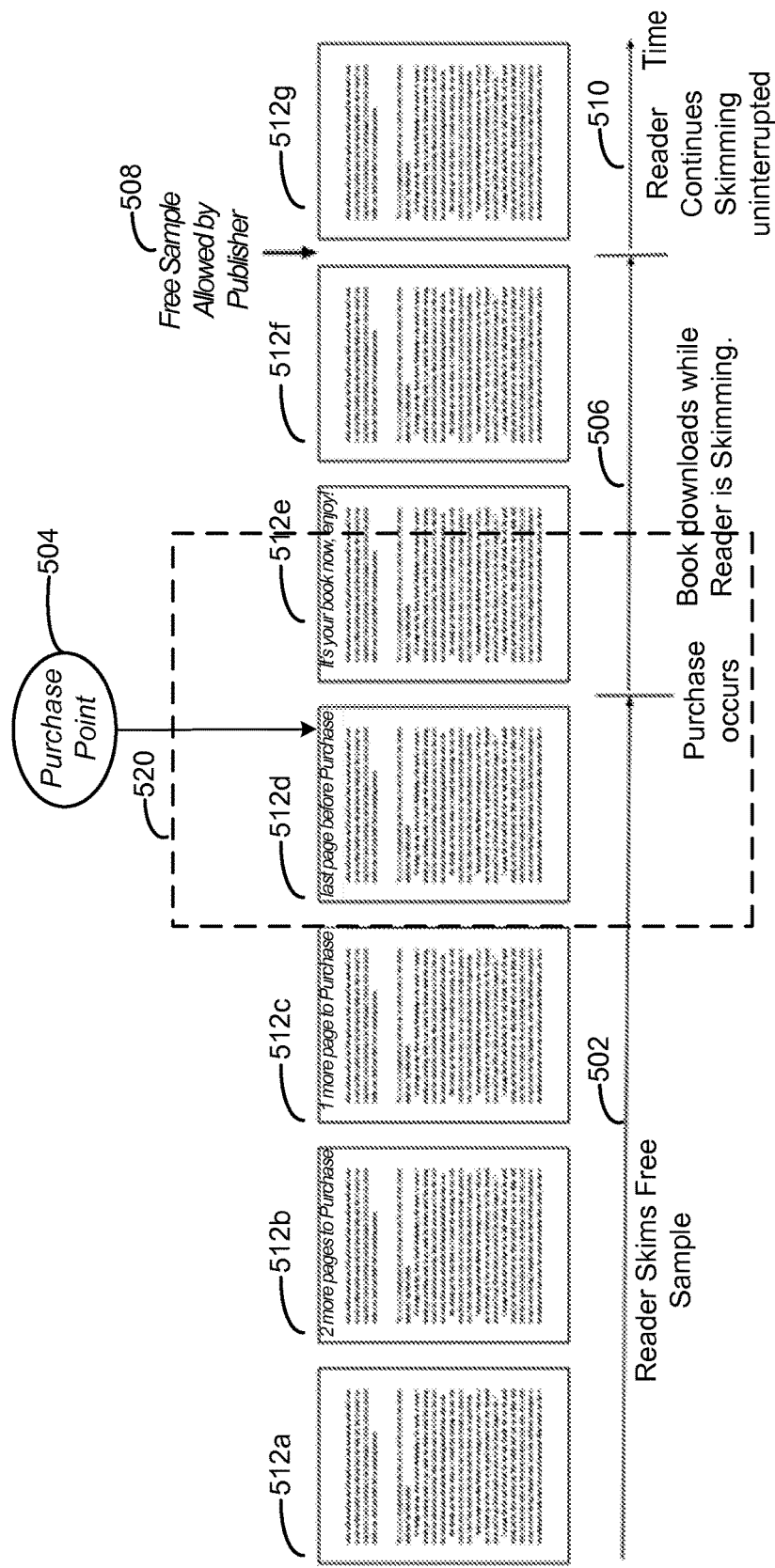
FIG. 5B is a diagram of a user viewing a page including a point of interest (POI) via the skim interface, according to one embodiment.

FIGS. 5A and 5B are diagrams describing the skimming experience provided by the environment of FIG. 1, according to one embodiment. FIG. 5A is a diagram of a user skimming through sample content by interacting with the skim interface 500. FIG. 5A illustrates six pages of sample content labeled 512*a*-512*f* and one page of full content 512*g*. In this example, the six pages 512*a*-512*f* were designated as a free sample by the publisher of the content. Thus, by agreement between the publisher and the distributor (e.g., an operator of the content server 130), the content server can provide these pages 512 to clients 110 free of charge. However, the distributor must pay the publisher for the content if the distributor provides the full content (e.g., page 412*g* and any subsequent pages) to the clients 110.

In the example of FIG. 5A the skim interface 500 maintains an array of pages 512 and includes a view frame 520. The view frame 520 in FIG. 5A presents a portion of the array of pages 512, i.e., pages 512*a*-512*c* to the user via the view frame 520. As described above, the view frame 520 of the skim interface 500 displays a portion of the array of pages 512 maintained by the skim interface to the user via the display of the client 110. In the example of FIG. 5A the sample content includes a POI, the purchase point 504. The reader application module 112 identifies the location of the purchase point 504 based on the metadata associated with the sample content and establishes the location of the purchase point 504 by identifying that the purchase point 504 is included in page 512*d*.

As the reader skims 502 the free sample content by performing consumption actions the array of pages 512 enter the view frame from the right edge of the view frame 520 and exit the view frame 520 and exit the view frame 520 from the left edge of the view frame 520. Further, the reader application module 112 applies a physics model describing the movement of pages through the view frame 520. The reader application module 520 determines that the user is approaching the purchase point 504 and applies an approach physics model associated with the purchase point type of POI and assigned to the purchase point 504 located at page 512*d*. This may result in the deceleration of the array of pages moving through the view frame 520, subsequent to the skim interface 500 receiving a consumption action from the user. Further, the reader application module 520 alerts the user of the approaching purchase point by displaying the ambient messages "2 more pages to purchase" and "1 more page to purchase," in the margins of pages 512*b* and 512*c*.

Moving now to the description of FIG. 5B. FIG. 5B describes the user viewing a page including a POI via the skim interface 500. As the page including the purchase point 512d enters the view frame 520, the page 512d and the array of pages 512, come to rest within the view frame 520 as a result of the approach physics model applied by the reader application module 112. In one example, the reader application module 112 alerts the user of the purchase point 504 by displaying an icon above page 512d within the negative space of the view frame 520. Further, the margins of the page 512d include the message "last page before Purchase."

As the array of pages 512 comes to a halt and the page 512d including the purchase point rests in the view frame 520, the reader application module 112 applies a departing physics model to the various aspects of the skim interface 500. The departing physics model associates different physical characteristics with the different aspects of the skim interface 500. The user upon performing a consumption action resulting in the movement of the pages 512d through the view frame 520 and the user skimming past the purchase point, as determined by the departing physics model results in the user purchasing the full version of the sample content. The user may then skim past the free sample limitation 508 of the sample content established by the publisher.

As illustrated by the horizontal arrows shown below the pages in FIG. 5A and FIG. 5B, the user's reading experience is divided into three time periods: a free sample skimming period represented by arrow 502; a transitional skimming period represented by arrow 506; and a full version skimming period represented by arrow 510. The free sample skimming period 502 occurs while the user is skimming through the free sample before reaching the purchase point. The transitional skimming period 506 occurs after the user has passed the purchase point 504 but before the user has reached the end of the sample content. During this transitional period, the client 110 seamlessly obtains or otherwise prepares the full version of the content for consumption by the user. The user can continue to skim the sample content during the transitional reading period 506. Page 512e is a portion of the sample content located immediately after the purchase point. The reader application module 112 may display a message, for example "it's your book now, enjoy!" in the margin of page 512e upon determining that the user has purchased the full version of the sample content. Eventually, the user skims past the end of the sample content (represented by page 512f). By this point, the client 110 has prepared the full content. The user may therefore continue to skim through the content beyond page 512g (i.e., skim through the full content 510) without any interruption in the reading experience.

Figure 6:
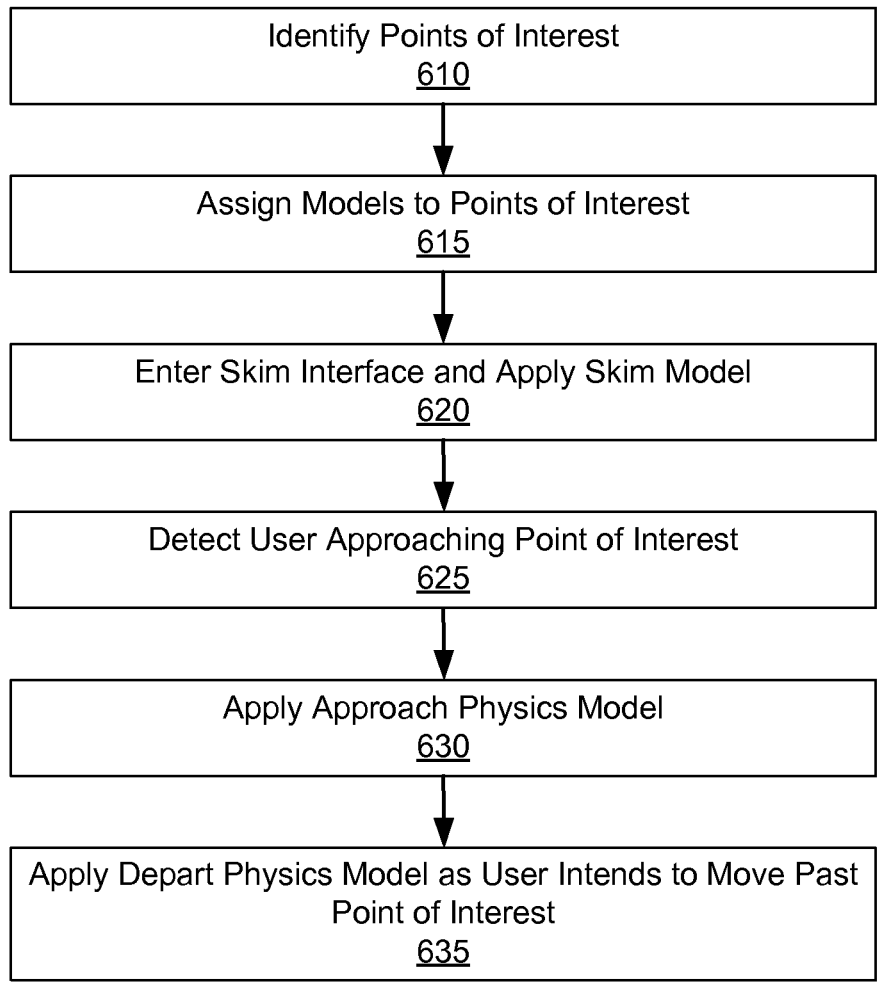
FIG. 6 is a flowchart illustrating steps performed by the reader application module to present content to the user via the skim interface, according to one embodiment.

FIG. 6 is a flowchart illustrating steps performed by the reader application module 112 to present content to the user via the skim interface. Other embodiments perform the illustrated steps in different orders, and/or perform different or additional steps. Moreover, some of the steps may be performed by entities other than the reader application module 112 for example the client 110 or the content server 130.

Initially, the reader application module 112 receives content, for example an e-book to present to the user via the reader interface or the skim interface. The reader application module 112 identifies 610 one or more points of interest (POIs) at locations in the content based on information present in the metadata associated with the content. For example, the reader application module 112 determines from the metadata the location of a bookmark in the content and identifies 610 the bookmark in a page of the array of pages representing the e-book as generated by the reader application module 112.

The reader application module 112 assigns 615 one or more physics models to at least some of the identified 610 POIs in the content. The reader application module 112 may identify the type and location of the identified 610 POIs and identifies one or more physics models to assign to each identified 610 POI based on the type and/or location of the identified 610 POIs. For example, the reader application module 112 may retrieve an approach physics model and a departing physics model associated with an identified POI from the skim store 405 based on the type of the identified POI and assigns the retrieved approach and departing physics models with the identified POI. The reader application module 112 may store the assignments 615 in the skim store 405.

The reader application module 112 presents 620 the skim interface to the user. For example, the user while interacting with the content presented to the user by the reader application module 112 may launch the skim interface resulting in the reader application module 112 presenting 620 the skim interface to the user. The skim interface presents 620 multiple pages of the e-book to the user on the screen of the client via the view frame of the skim interface. The reader application maintains an array of pages of the e-book upon generating the skim interface and presents 620 the user with a portion of the array of pages via the view frame of the skim interface. Further, the reader application module 112 upon launching the skim interface applies 620 the standard physics model that describes how the different aspect of the skim interface interact with one another by associating physical characteristics with the consumption actions performed by the user, the pages of the e-book displayed to the user via the skim interface and the view frame of the skim interface. Thus, in one example, upon receiving a consumption action from the user, the reader application module 112 interprets the consumption action, based on the standard physics model, as imparting an amount of energy to the array of pages causing the array of pages to accelerate and then decelerate through the view frame of the skim interface. The user may therefore skim through the pages of the e-book as presented 620 by the reader application module 112 via the skim interface.

As the user skims through the skim interface the user's current position in the skim interface may approach an identified 610 POI located in the content of the e-book. The reader application module 112 detects 625 the user's current position approaching that of an identified 610 POI. For example, the reader application module 112 detects 625 that the user is approaching a POI if the page including the POI in the array of pages maintained by the reader application module 112, is less than a threshold number of pages from entering the view frame of the skim interface.

In one embodiment, the reader application module 112 upon detecting that the user's current position is approaching that of an identified POI, applies the approach physics model assigned 615 to the POI. In one embodiment, by applying the assigned 615 approach physics model the reader application module 112 may modify an underlying physics model to include the physical characteristics specified by the assigned approach physics model. In another embodiment, the reader application module 112 applies the assigned approach physics model in place of the standard or underlying physics model.

As the page including the POI comes to a rest in the view frame of the skim interface, based on the applied approach model, the user's attention is drawn to the POI included in the page. The user may then intend to skim past the page including the POI and depart the page including the POI. Prior to the user performing a consumption action to depart from the page including the POI, the reader application module 112 applies the departing physics model assigned 615 to the identified POI. The departing physics model determines how the reader application module 112 interprets consumption actions received from the user with respect to departing the page including the POI and determines the movement of the array of pages through the view frame subsequent to the user performing a consumption action to skim past the page including the POI.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A computer-implemented method comprising:
   displaying an interface including a plurality of pages of a digital content to a user of a client;
   identifying a point of interest included in a page of the plurality of pages of the digital content included in the interface;
   determining a type of the point of interest as being at least one of a purchase point type, a video type, an image type, a bookmark type, or an annotation type;
   selecting, based at least in part on the type of the point of interest, a physics model for the point of interest from a plurality of physics models, wherein each physics model from the plurality of physics models is associated with at least one of the purchase point type, the video type, the image type, the bookmark type, or the annotation type, and wherein each physics model from the plurality of physics models defines a respective different manner in which one or more physical characteristics of displayed aspects of the digital content interact, a respective type and value of a physical characteristic associated with each page of the plurality of digital pages, and a respective type of physical object associated with a view frame of the interface; and
   applying the physics model for the point of interest to the digital content.

2. The computer-implemented method of claim 1, wherein identifying the point of interest included in the page of the plurality of pages of the digital content comprises:
   determining, based on metadata associated with the digital content, a location of the point of interest in the digital content; and
   identifying, based on the location of the point of interest in the digital content, the page in the plurality of pages in which to include the point of interest.

3. The computer-implemented method of claim 1, wherein selecting the physics model for the point of interest comprises:
   identifying an approach physics model associated with the point of interest from the plurality of physics models; and
   selecting the approach physics model as the physics model for the point of interest.

4. The computer-implemented method of claim 3, wherein applying the physics model for the point of interest to the digital content comprises:
   responsive to determining that the page of the plurality of pages including the point of interest is approaching a view frame of the interface, applying the approach physics model.

5. The computer-implemented method of claim 4, wherein applying the approach physics model modifies movement of the plurality of pages through the interface such that the page including the point of interest is brought to rest in the interface being displayed.

6. The computer-implemented method of claim 3, wherein applying the physics model for the point of interest to the digital content comprises:
   responsive to determining that the page of the plurality of pages including the point of interest is approaching a view frame of the interface, modifying an underlying physics model to include characteristics of the approach physics model.

7. The computer-implemented method of claim 1, wherein selecting the physics model for the point of interest comprises:
   identifying a departing physics model associated with the point of interest from the plurality of physics models; and
   selecting the departing physics model as the physics model for the point of interest.

8. The computer-implemented method of claim 7, wherein applying the physics model for the point of interest to the digital content comprises:
   responsive to receiving a user interaction after including the point of interest in the interface, applying the departing physics model.

9. The computer-implemented method of claim 1, wherein:
   the type of the point of interest is a purchase point type,
   the point of interest is located on a first page from the plurality of pages of the digital content, and
   the physics model associated with the purchase point type causes the digital content to be automatically purchased in response to a user interaction to display a second page from the plurality of pages, the second page being located after the first page in the plurality of pages of the digital content.

10. A non-transitory computer-readable storage medium storing executable computer program instructions, the instructions executable to perform steps comprising:
   displaying an interface including a plurality of pages of a digital content to a user of a client;
   identifying a point of interest included in a page of the plurality of pages of the digital content included in the interface;
   determining a type of the point of interest as being at least one of a purchase point type, a video type, an image type, a bookmark type, or an annotation type;
   selecting, based at least in part on the type of the point of interest, a physics model for the point of interest from a plurality of physics models, wherein each physics model from the plurality of physics models is associated with at least one of the purchase point type, the video type, the image type, the bookmark type, or the annotation type, and wherein each physics model from the plurality of physics models defines a respective different manner in which one or more physical characteristics of displayed aspects of the digital content interact, a respective type and value of a physical characteristic associated with each page of the plurality of digital pages, and a respective type of physical object associated with a view frame of the interface; and applying the physics model for the point of interest to the digital content.

11. The non-transitory computer-readable storage medium of claim 10, wherein identifying the point of interest included in the page of the plurality of pages of the digital content comprises:
  determining, based on metadata associated with the digital content, a location of the point of interest in the digital content; and
  identifying, based on the location of the point of interest in the digital content, the page in the plurality of pages in which to include the point of interest.

12. The non-transitory computer-readable storage medium of claim 10, wherein selecting the physics model for the point of interest comprises:
  identifying an approach physics model associated with the point of interest from the plurality of physics models; and
  selecting the approach physics model as the physics model for the point of interest.

13. The non-transitory computer-readable storage medium of claim 12, wherein applying the physics model for the point of interest to the digital content comprises:
  responsive to determining that the page of the plurality of pages including the point of interest is approaching a view frame of the interface, applying the approach physics model.

14. The non-transitory computer-readable storage medium of claim 13, wherein applying the approach physics model modifies movement of the plurality of pages through the interface such that the page including the point of interest is brought to rest in the interface being displayed.

15. The non-transitory computer-readable storage medium of claim 13 wherein applying the physics model for the point of interest to the digital content comprises:
  responsive to determining that the page of the plurality of pages including the point of interest is approaching a view frame of the interface, modifying an underlying physics model to include characteristics of the approach physics model.

16. The non-transitory computer-readable storage medium of claim 10, wherein selecting the physics model for the point of interest comprises:
  identifying a departing physics model associated with the point of interest from the plurality of physics models; and
  selecting the departing physics model as the physics model for the point of interest.

17. A computer comprising:
  a computer processor for executing computer program instructions;
  a non-transitory computer-readable storage medium storing computer program instructions executable to:
    identify a point of interest included in a page of the plurality of pages of the digital content included in the interface;
    determine a type of the point of interest as being at least one of a purchase point type, a video type, an image type, a bookmark type, or an annotation type;
    select, based at least in part on the type of the point of interest, a physics model for the point of interest from a plurality of physics models, wherein each physics model from the plurality of physics models is associated with at least one of the purchase point type, the video type, the image type, the bookmark type, or the annotation type, and wherein each physics model from the plurality of physics models defines a respective different manner in which one or more physical characteristics of displayed aspects of the digital content interact, a respective type and value of a physical characteristic associated with each page of the plurality of digital pages, and a respective type of physical object associated with a view frame of the interface; and
    apply the physics model for the point of interest to the digital content.

18. The non-transitory computer-readable storage medium of claim 10, wherein:
  the type of the point of interest is a purchase point type,
  the point of interest is located on a first page from the plurality of pages of the digital content, and
  the physics model associated with the purchase point type causes the digital content to be automatically purchased in response to a user interaction to display a second page from the plurality of pages, the second page being located after the first page in the plurality of pages of the digital content.

19. The computer of claim 17, wherein:
  the type of the point of interest is a purchase point type,
  the point of interest is located on a first page from the plurality of pages of the digital content, and
  the physics model associated with the purchase point type causes the digital content to be automatically purchased in response to a user interaction to display a second page from the plurality of pages, the second page being located after the first page in the plurality of pages of the digital content.

* * * * *